US009896133B2

(12) United States Patent
Elfwing

(10) Patent No.: US 9,896,133 B2
(45) Date of Patent: Feb. 20, 2018

(54) SILL STRUCTURE

(71) Applicant: VOLVO CAR CORPORATION, Gothenburg (SE)

(72) Inventor: Jens Elfwing, Torslanda (SE)

(73) Assignee: VOLVO CAR CORPORATION (SE)

( * ) Notice: Subject to any disclaimer, the term of this patent is extended or adjusted under 35 U.S.C. 154(b) by 0 days.

(21) Appl. No.: 15/143,736

(22) Filed: May 2, 2016

(65) Prior Publication Data
US 2016/0325786 A1 Nov. 10, 2016

(30) Foreign Application Priority Data

May 8, 2015 (EP) ..................... 15166893

(51) Int. Cl.
B62D 21/15 (2006.01)
B62D 25/02 (2006.01)
B62D 29/00 (2006.01)

(52) U.S. Cl.
CPC ......... B62D 25/025 (2013.01); B62D 21/157 (2013.01); B62D 29/008 (2013.01)

(58) Field of Classification Search
CPC ... B62D 25/025; B62D 21/157; B62D 29/008
See application file for complete search history.

(56) References Cited

U.S. PATENT DOCUMENTS 5,443,297 A 8/1995 Tanaka et al.
2013/0049408 A1 2/2013 Kurogi et al.

FOREIGN PATENT DOCUMENTS

| DE | 102013004852 A1 | 9/2014 | |
|---|---|---|---|
| WO | WO 2014083704 A1 * | 6/2014 | ........... B62D 25/025 |
| WO | WO 2015033714 A1 * | 3/2015 | ........... B62D 25/025 |

OTHER PUBLICATIONS

Extended European Search Report dated Oct. 15, 2015, Application No. 15166893.6-1757, Applicant Volvo Car Corporation, 6 Pages

* cited by examiner

*Primary Examiner* — D Glenn Dayoan
*Assistant Examiner* — Melissa A Black
(74) *Attorney, Agent, or Firm* — Brooks Kushman, P.C.

(57) ABSTRACT

A sill structure for a vehicle comprises an outer member, an inner member located laterally inside the outer member as seen in a transverse direction of the vehicle, and a reinforcement member located laterally between the outer member and the inner member. An upper end portion of the inner member is attached to the reinforcement member in a first connection. An upper end portion of the outer member is attached to the reinforcement member in a second connection being located vertically below and separate from the first connection. A lower end portion of the inner member is attached to the reinforcement member and to a lower end portion of the outer member in a third connection being located vertically below and separate from the first connection and the second connection. The reinforcement member extends in a straight way or substantially straight way between the second connection and the third connection.

20 Claims, 3 Drawing Sheets

SILL STRUCTURE

CROSS-REFERENCE TO RELATED APPLICATIONS

This application claims foreign priority benefits under 35 U.S.C. § 119(a)-(d) to European patent application number EP 15166893.6, filed May 8, 2015, which is incorporated by reference in its entirety.

TECHNICAL FIELD

The present disclosure relates to a sill structure for a vehicle. The disclosure further relates to a vehicle comprising such a sill structure.

BACKGROUND

By law, all new car models must pass certain safety tests and certifying procedures in different countries or regions, such as side impact tests, for example pole side impact tests, before they are sold.

Several reinforcement structures for vehicles having improved side impact crash behavior have been disclosed in the prior art. For example, U.S. Pat. No. 5,443,297 discloses a structure of a side portion of a vehicle body having a side outer panel in which a side sill outer member and a pillar outer member are integrally formed. A first enclosed cross-sectional member is formed by a connecting of a side sill inner member and a side sill reinforcing member. A second enclosed cross-sectional member is formed by connecting the side sill outer member and the side sill reinforcing member.

SUMMARY

An object of the present disclosure is to overcome or ameliorate at least one of the disadvantages of the prior art, or to provide a useful alternative.

Thus, in a first aspect of the present disclosure there is provided a sill structure for a vehicle. The structure comprises an outer member, an inner member, which is located laterally inside the outer member as seen in a transverse direction of the vehicle, and a reinforcement member, which is located laterally between the outer member and the inner member as seen in the transverse direction of the vehicle. An upper end portion of the inner member is attached to the reinforcement member in a first connection. An upper end portion of the outer member is attached to the reinforcement member in a second connection, which is located vertically below and separate from the first connection. A lower end portion of the inner member is attached to the reinforcement member and to a lower end portion of the outer member in a third connection, which is located vertically below and separate from the first connection and the second connection. The reinforcement member extends in a straight way or substantially straight way between the second connection and the third connection.

The sill structure forms part of a body of the vehicle. The sill structure extends in a longitudinal direction of the vehicle below a front door opening and a rear door opening. The longitudinal direction coincides with the normal driving direction of the vehicle. There is further a transverse direction, extending laterally in the vehicle. The transverse direction is perpendicular to the longitudinal direction. A vertical direction is perpendicular to both the transverse direction and the longitudinal direction.

The sill structure may be manufactured and sold as a separate unit. The directions as used herein are related to when the sill structure is mounted in the vehicle. However, e.g., during manufacturing, storage and transport of the sill structure, it may assume another orientation.

As seen along the vertical direction, the first connection is vertically above the second connection, i.e., at a higher vertical level. The second connection is in turn located vertically above the third connection. The first, second and third connections are separate from each other.

The outer member, the inner member and the reinforcement member extend in the longitudinal direction of the vehicle for a portion, for a main portion or for the full length of the sill structure. Thereby the first, second and third connections also extend in the longitudinal direction of the vehicle for a portion, for a main portion or for the full length of the sill structure.

The reinforcement member extends in a straight way or substantially straight way between the second connection and the third connection. The reinforcement member preferably also extends in a straight way or substantially straight way between the first and the second connection. More preferably, the reinforcement member extends in a straight way or substantially straight way between the first connection and the third connection. Extending in a straight way or substantially straight way is interpreted as that the reinforcement member extends without any bend or curvature changing the extension direction of the reinforcement member by more than 20 degrees. Preferably there is no bend or curvature hanging the extension direction of the reinforcement member by more than 10 degrees. The reinforcement member may for example extend the shortest distance or substantially the shortest distance between the second connection and the third connection. This is most easily seen when viewing a transverse cross-sectional profile of the sill structure.

The first, second and/or third connections may be spot-welded or laser welded. As an alternative, an adhesive may be used or any known fastening means, such as rivets. The first connection may form a wind-cord flange. The third connection may form a sill bottom flange.

An advantage of using a separate second connection for the outer member is that most of the side impact load will be taken up by the second connection, thereby subjecting the first connection to less load than would be the case if the outer member and the inner member were attached in the same connection.

As mentioned above, the second connection comprising the outer member is located vertically below the first connection. In particular, an upper edge of the outer member may be located vertically below the first connection and separate from the first connection, such that the outer member is not present in the first connection. This is most easily seen when viewing a transverse cross-sectional profile of the sill structure.

The reinforcement member may extend between the first connection and the third connection at a small angle $\alpha$ to the vertical direction. The angle $\alpha$ may be within +/−15 degrees, preferably within +/−10 degrees, more preferably within +/−5 degrees from the vertical direction. This angle $\alpha$ is a result of that the second connection is located laterally outwards or laterally inwards of the third connection. The reinforcement member may extend substantially vertically or vertically, between the first connection and third connection, i.e., along the vertical direction, in case the second connection is located vertically above of the third connection without any lateral difference.

A transverse cross-sectional profile of the inner member may comprise a side wall portion extending substantially vertically and spaced apart from the reinforcement member, e.g., within +/−15 degrees, preferably within +/−10 degrees, more preferably within +/−5 degrees from the vertical direction. The inner member bulges inwardly, i.e., in a direction into a passenger compartment of the vehicle, from the reinforcement member and the first and third connections. A portion of the inner member and a portion of the reinforcement member may form an inner chamber located vertically between the first connection and third connection.

A transverse cross-sectional profile of the outer member may comprise a side wall portion extending substantially vertically and spaced apart from the reinforcement member, e.g., within +/−15 degrees, preferably within +/−10 degrees, more preferably +/−5 degrees from the vertical direction. The outer member bulges outwardly, i.e., in a direction facing away from the passenger compartment, from the reinforcement member and the second and third connections. A portion of the outer member and a portion of the reinforcement member may form an outer chamber located vertically between the second connection and third connection.

The transverse cross-sectional profile of the outer member may comprise an indentation, which preferably forms a step in the transverse cross-sectional profile. The indentation improves the strength properties of the outer member. In addition, the indentation allows other components to be contained in a space formed between the outer member and an outer panel, which outer panel is further described below.

The outer member may comprise or consist of a stronger material than the inner member. The outer member may have a tensile strength of at least 1300 MPa.

The inner member and/or the reinforcement member may comprise or consist of a more ductile material than the outer member. The elongation at fracture for the inner member and/or the reinforcement member may be selected to be above 10%.

The materials of the outer member and the inner member may be purposely selected, such that the material of the outer member is selected to be stronger than that of the inner member, while the material of the inner member is selected to be more ductile than that of the outer member. Also the reinforcement member may comprise a material, which is more ductile than that of the outer member. Different kinds of material may be utilized for the outer member and the inner member, e.g., two different kinds of steel. Since two different materials may be utilized, the material properties of the respective outer member and the inner member may be selected independently of each other.

If the vehicle would be subjected to a pole side impact situation at the sill structure, the pole might press the sill structure laterally inwards, into the vehicle passenger compartment. An outside portion of the sill structure will then be subjected to a pressure load, while an inside portion of the sill structure will be subjected to a tension load. It is, hence, beneficial that the outer member is stronger and the inner member is more ductile. Hence, the sill structure will bend without cracking, or at least it will be substantially less likely to crack, due to the high ductility of the inner member. The sill structure will therefore improve the ability of the vehicle to survive the side impact without suffering passenger compartment intrusion.

The sill structure may further comprise an outer panel member located laterally outside of the outer member as seen in the transverse direction of the vehicle, which outer panel member is attached to the reinforcement member at the first connection.

As an option, a reinforcement body may be located in the inner chamber formed by the inner member and the reinforcement member. The reinforcement body extends in the longitudinal direction of the vehicle for a portion of the length of the sill structure, for a main portion or for the full length of the sill structure.

The reinforcement body may be an extruded profile, preferably an extruded aluminum profile. Aluminum is a suitable material, since it is good at absorbing energy, which is beneficial in a collision scenario, yet is has a relatively low weight.

The reinforcement body may extend vertically at least up to a lower end of the second connection. Thereby a transverse load path may be formed by a substantially transversely extending portion of the outer member and the reinforcement body.

The reinforcement body may comprise at least one wall substantially extending in the transverse direction. The reinforcement body may comprise outer walls, e.g., one or two, extending in the transverse direction and/or at least one inner wall extending in the transverse direction.

In a second aspect of the present disclosure there is provided a vehicle comprising a sill structure as described herein.

BRIEF DESCRIPTION OF THE DRAWINGS

The present disclosure will hereinafter be further explained by means of non-limiting examples with reference to the appended drawings, wherein.

It should be noted that the appended drawings are not necessarily drawn to scale and that the dimensions of some features of the present disclosure may have been exaggerated or minimized for the sake of clarity. Therefore, specific structural and functional details disclosed herein are not to be interpreted as limiting, but merely as a representative basis for teaching one skilled in the art.

DETAILED DESCRIPTION

The disclosure will, in the following, be exemplified by embodiments. It should however be realized that the embodiments are included in order to explain principles of the disclosure and not to limit the scope of the disclosure, as defined by the appended claims. Details from two or more of the embodiments may be combined with each other.

Figure 1:
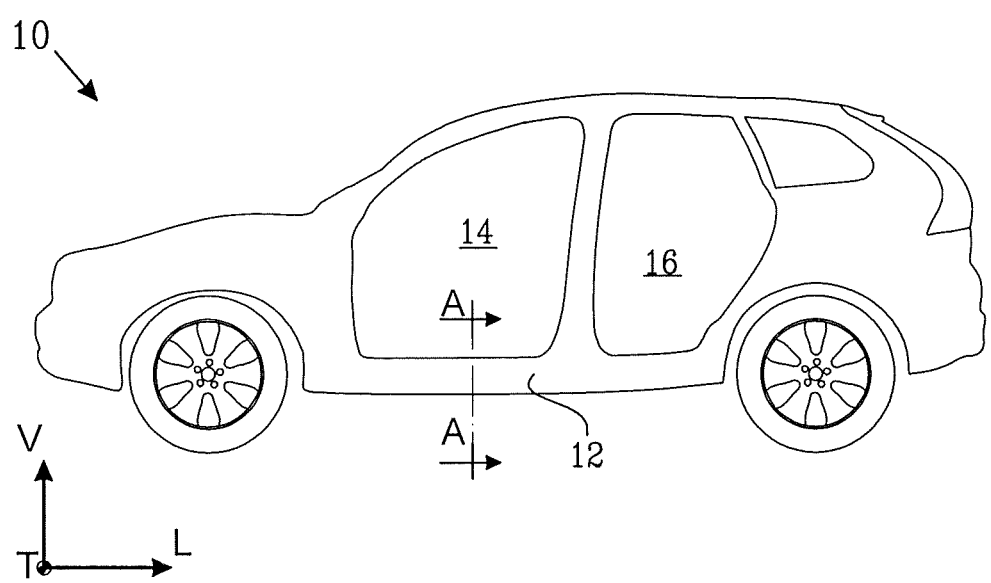
FIG. 1 is a side view of a vehicle according to the disclosure comprising a sill structure according to the disclosure.

FIG. 1 illustrates a side view of a vehicle 10 according to the disclosure. The vehicle 10 comprises a sill structure 12 according to the disclosure forming part of a body of the vehicle 10. Although only one lateral side can be seen in FIG. 1, there is usually a sill structure 12 at both lateral sides of the vehicle 10.

The sill structure 12 extends in a longitudinal direction L of the vehicle 10 below a front door opening 14 and a rear door opening 16. The longitudinal direction L coincides with the normal driving direction of the vehicle 10. There is further a transverse direction T, extending laterally in the vehicle 10. The transverse direction T is perpendicular to the longitudinal direction L. A vertical direction V is perpendicular to both the transverse direction T and the longitudinal direction L.

Figure 2:
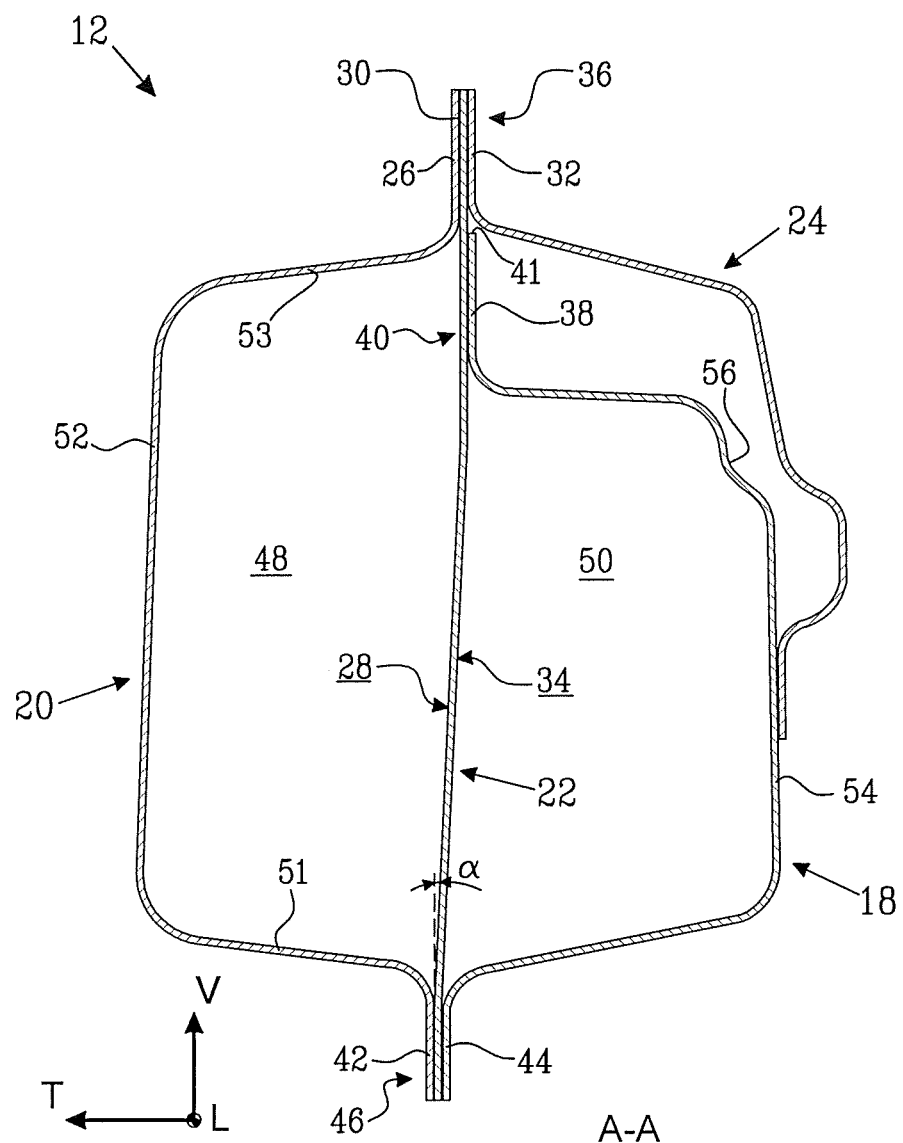
FIG. 2 is a transverse cross-sectional view of a sill structure according to the disclosure.

FIG. 2 illustrates a transverse cross-section of the sill structure 12 of FIG. 1. The sill structure 12 comprises an outer member 18, an inner member 20 and a reinforcement member 22. The outer member 18, the inner member 20 and the reinforcement member 22 extend in the longitudinal direction L of the vehicle 10 for a portion, for a main portion or for the full length of the sill structure 12. The inner member 20 is located laterally inside the outer member 18 as seen in the transverse direction T of the vehicle 10. The reinforcement member 22 is located laterally between the outer member 18 and the inner member 20 as seen in the transverse direction T. The sill structure 12 further comprises an outer panel member 24 located laterally outside of the outer member 18, which outer panel member 24 also extends in the longitudinal direction L of the vehicle 10.

An upper end portion of the inner member 20 forming an upper flange 26 is attached to an inwards facing surface 28 of the reinforcement member 22 in a first connection 30, e.g., by spot welding or laser welding. An upper end portion of the outer panel member 24 forming an upper flange 32 is attached to an outwards facing surface 34 of the reinforcement member 22, e.g., by spot welding or laser welding. The upper flange 26 of the inner member 20 and the upper flange 32 of the outer panel member 24 form a wind-cord flange 36 together with the portion of the reinforcement member 22 to which they are attached.

An upper end portion of the outer member 18 forming an upper flange 38 is attached to the outwards facing surface 34 of the reinforcement member 22 in a second connection 40, e.g., by spot welding or laser welding. The second connection 40 is located vertically below and separate from the first connection 30. In particular, an upper edge 41 of the outer member 18 is located vertically below and separate from the first connection 30, such that the outer member 18 is not present in the wind-cord flange 36.

A lower end portion of the inner member 20 forming a lower flange 42 is attached to the reinforcement member 22 and to a lower end portion of the outer member 18 forming a lower flange 44 in a third connection 46, being located vertically below and separate from the first connection 30 and the second connection 40. The third connection 46 forms a sill bottom flange of the sill structure 12.

A portion of the inner member 20 and a portion of the reinforcement member 22 form an inner chamber 48 located vertically between the first connection 30 and third connection 46. A portion of the outer member 18 and a portion of the reinforcement member 22 form an outer chamber 50 located vertically between the second connection 40 and third connection 46.

The reinforcement member 22 extends in a straight way, or substantially straight way, between the first connection 30 and the third connection 46, in the illustrated embodiment at a small angle α to the vertical direction V. The angle α is within +/−15 degrees, preferably within +/−10 degrees, more preferably +/−5 degrees from the vertical direction. This angle α is in the illustrated embodiment a result of that the second connection 38 is located laterally outwards of the third connection 46. However, it is also feasible that the second connection 38 is located laterally inwards of the third connection 46. The reinforcement member 22 may also extend substantially vertically or vertically, in case the second connection 38 is located vertically above of the third connection 46 without any lateral difference. The reinforcement member 22 extends in a straight way or substantially straight way without any curvature or bends. In particular, there is no sharp bend changing the extension direction of the reinforcement member 22 by more than 20 degrees.

The inner panel member 20 comprises a side wall portion 52 extending substantially vertically and spaced apart from the reinforcement member 22. Hence the inner chamber 48 has a substantially trapezoidal transverse cross-sectional shape with the side wall portion 52 being the shorter of the two substantially parallel sides. If the other wall portions are close to transverse, as in the illustrated embodiment, the inner chamber 48 may even have a substantially rectangular transverse cross-sectional shape.

The outer member 18 comprises a side wall portion 54 extending substantially vertically and spaced apart from the reinforcement member 22. The side wall portion 54 of the outer member 18 comprises an indentation 56 providing a step in the cross-sectional profile of the outer member 18 being beneficial for the strength properties of the outer member 18. In addition, the indentation 56 allows other components to be contained in a space formed between the outer member 18 and the outer panel 24.

Except for the indentation 56, the outer chamber 50 has a substantially trapezoidal shape with the side wall portion 54 being the shorter of the two substantially parallel sides. Since the second connection 40 is located vertically below the first connection 30, the cross-sectional area of the outer chamber 50 is usually smaller than that of the inner chamber 48.

The materials of the outer member 18 and the inner member 20 may be purposely selected, such that the material of the outer member 18 is selected to be stronger than that of the inner member 20, while the material of the inner member 20 is selected to be more ductile than that of the outer member 18. Also the reinforcement member 22 may comprise a material, which is more ductile than that of the outer member 18. Different kinds of material may be utilized for the outer member 18 and the inner member 20, e.g., two different kinds of steel. Since two different materials may be utilized, the material properties of the respective outer member 18 and the inner member 20 may be selected independently of each other.

If the vehicle 10 would be subjected to a pole side impact situation at the sill structure 12, the pole might press the sill structure 12 laterally inwards, into the vehicle passenger compartment. An outside portion of the sill structure 12 will then be subjected to a pressure load, while an inside portion of the sill structure 12 will be subjected to a tension load. It is, hence, beneficial that the outer member 18 is stronger and the inner member 20 is more ductile, as described above. Hence, the sill structure 12 as described herein will bend without cracking, or at least it will be substantially less likely to crack, due to the high ductility of the inner member 20. The sill structure 12 will therefore improve the ability of the vehicle 10 to survive the side impact without suffering passenger compartment intrusion.

Figure 3:
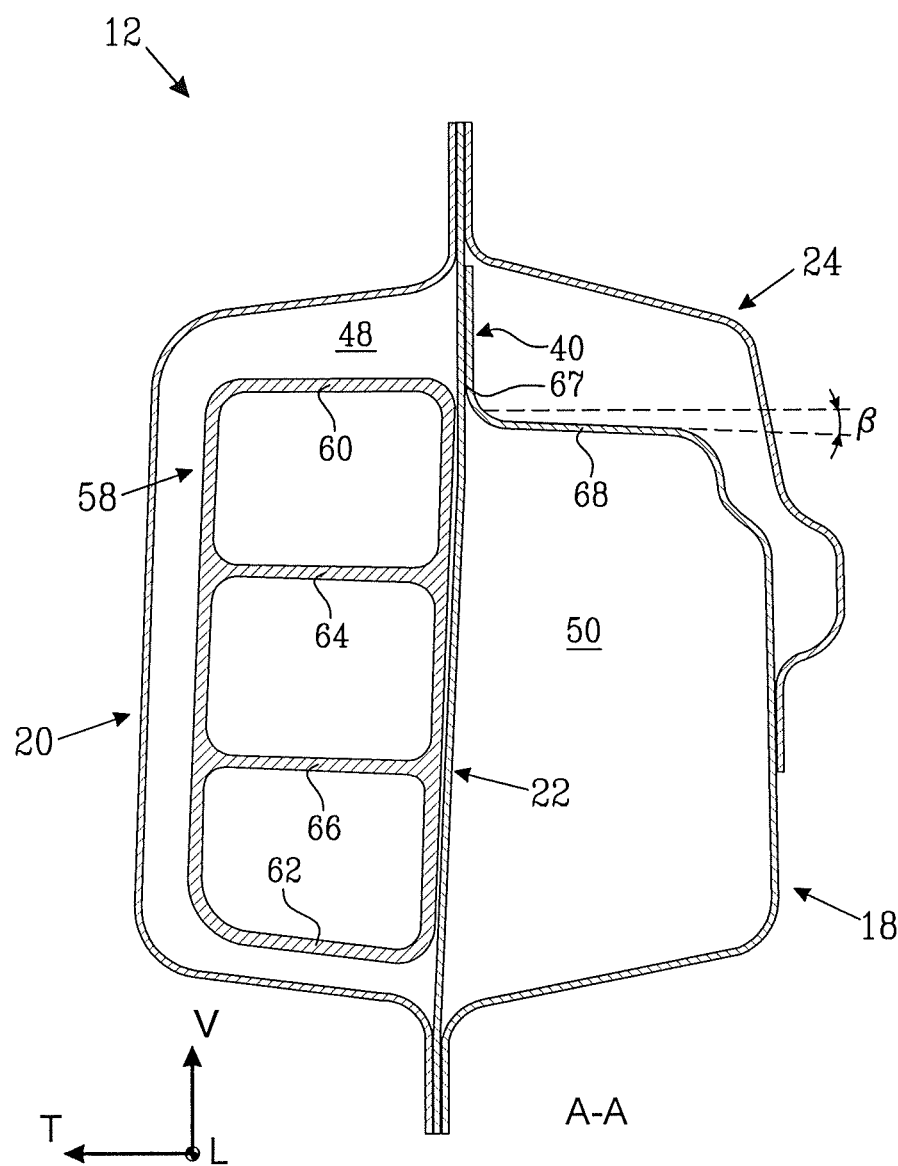
FIG. 3 is a transverse cross-sectional view of another sill structure according to the disclosure.

As an option, a reinforcement body 58 may be located in the inner chamber 48, as is illustrated in FIG. 3. The reinforcement body 58 extends in the longitudinal direction L of the vehicle 10 for a portion of the length of the sill structure 12, for a main portion or for the full length of the sill structure 12. In the illustrated embodiment, the reinforcement body 58 is an extruded aluminum profile. Aluminum is a suitable material, since it is good at absorbing energy, which is beneficial in a collision scenario, yet is has a relatively low weight.

The reinforcement body 58 comprises at least one wall extending substantially in the transverse direction T. In the illustrated embodiment, there are two outer walls 60, 62 extending transversely and two inner walls 64, 66 also extending transversely. The reinforcement body 58 extends vertically at least up to a lower end 67 of the second connection 40. In the illustrated embodiment it extends somewhat vertically above.

A portion 68 of the outer member 18 being located adjacent to the second connection 40 extends substantially transversely with an angle β to a horizontal line, the angle β preferably being between 0 and 15 degrees. This portion 68 is substantially aligned with the upper outer wall 60 of the reinforcement body 58. If the vehicle 10 is subjected to a side impact scenario, this portion 68 may form a load path together with the transversely extending walls 60, 62, 64, 66 of the reinforcement body 58, in this embodiment in particular the upper outer wall 60, which load path is suitable for taking up forces being at least partly in the transverse direction T.

Since the outer member 18 is attached to the reinforcement member 22 in its own separate connection, i.e., the second connection 40, it is possible to use a small angle β, hence providing a substantially transverse load path. Such a small angle β is beneficial also for other sill structures 12 according to the disclosure, also including sill structures not comprising the optional reinforcement body 58, such as the sill structure 12 illustrated in FIG. 2. The portion 68 will provide a load path for taking up forces being at least partly in the transverse direction T.

As an alternative, or a complement, to providing the reinforcement body 58 in the inner chamber 48, a reinforcement body, e.g., an extruded aluminum profile, may be provided in the outer chamber 50.

An advantage of using a separate second connection 40 for the outer member 18 is that most of the side impact load will be taken up by the second connection 40, thereby subjecting the first connection 30 to less load, as would be the case if the outer member 18 and the inner member 20 were attached in the same connection. The first connection 30 may then be more ductile and the second connection 40 stronger.

Further modifications of the disclosure within the scope of the appended claims are feasible. Additionally, the features of various implementing embodiments may be combined to form further embodiments according to the disclosure. As such, the present disclosure should not be considered as limited by the embodiments and figures described herein. Rather, the full scope of the disclosure should be determined by the appended claims, with reference to the description and drawings.

What is claimed is:

1. A sill structure for a vehicle, the sill structure comprising:
    an outer member;
    an inner member located laterally inside the outer member as seen in a transverse direction of the vehicle when the sill structure is mounted in the vehicle; and
    a reinforcement member located laterally between the outer member and the inner member as seen in the transverse direction of the vehicle when the sill structure is mounted in the vehicle;
    wherein the sill structure is configured so that, when the sill structure is mounted in the vehicle,
        an upper end portion of the inner member is attached to the reinforcement member in a first connection,
        an upper end portion of the outer member is attached to the reinforcement member in a second connection entirely located vertically below and separate from the first connection,
        a lower end portion of the inner member is attached to the reinforcement member and to a lower end portion of the outer member in a third connection located vertically below and separate from the first connection and the second connection, and
        the reinforcement member extends in a straight way or substantially straight way between the second connection and the third connection.

2. The sill structure according to claim 1 wherein an upper edge of the outer member is located vertically below the first connection when the sill structure is mounted in the vehicle.

3. The sill structure according to claim 1 wherein the reinforcement member extends between the first connection and the third connection at an angle α to a vertical direction being within +/−15 degrees when the sill structure is mounted in the vehicle.

4. The sill structure according to claim 1 wherein a transverse cross-sectional profile of the inner member comprises a side wall portion extending substantially vertically and spaced apart from the reinforcement member when the sill structure is mounted in the vehicle.

5. The sill structure according to claim 1 wherein a transverse cross-sectional profile of the outer member comprises a side wall portion extending substantially vertically and spaced apart from the reinforcement member when the sill structure is mounted in the vehicle.

6. The sill structure according to claim 5 wherein the transverse cross-sectional profile of the outer member comprises an indentation.

7. The sill structure according to claim 5 wherein the indentation forms a step in the transverse cross-sectional profile.

8. The sill structure according to claim 1 wherein the outer member comprises a stronger material than the inner member.

9. The sill structure according to claim 1 wherein the inner member and/or the reinforcement member comprise/comprises a more ductile material than the outer member.

10. The sill structure according to claim 1 further comprising an outer panel member located laterally outside of the outer member as seen in the transverse direction of the vehicle when the sill structure is mounted in the vehicle, wherein the outer panel member is attached to the reinforcement member at the first connection.

11. The sill structure according to claim 1 further comprising a reinforcement body located in an inner chamber formed by the inner member and the reinforcement member.

12. The sill structure according to claim 11 wherein the reinforcement body is an extruded profile.

13. The sill structure according to claim 12 wherein the extruded profile comprises aluminum.

14. The sill structure according to claim 11 wherein the reinforcement body extends vertically at least up to a lower end of the second connection when the sill structure is mounted in the vehicle.

15. The sill structure according to claim 11 wherein the reinforcement body comprises at least one wall substantially extending in the transverse direction when the sill structure is mounted in the vehicle.

16. A vehicle comprising the sill structure according to claim 1.

17. The sill structure according to claim 1 wherein the upper end portion of the outer member is attached directly to the reinforcement member at the second connection.

18. A sill structure for a vehicle, the sill structure comprising:
- an outer member;
- an inner member located laterally inside the outer member as seen in a transverse direction of the vehicle when the sill structure is mounted in the vehicle; and
- a reinforcement member located laterally between the outer member and the inner member as seen in the transverse direction of the vehicle when the sill structure is mounted in the vehicle;

wherein the sill structure is configured so that, when the sill structure is mounted in the vehicle,
- an upper end portion of the inner member is attached to the reinforcement member in a first connection,
- an upper end portion of the outer member is attached to the reinforcement member in a second connection located vertically below and separate from the first connection,
- a lower end portion of the inner member is attached to the reinforcement member and to a lower end portion of the outer member in a third connection located vertically below and separate from the first connection and the second connection,
- the reinforcement member extends in a straight way or substantially straight way between the second connection and the third connection, and
- an upper edge of the outer member is located vertically below the first connection when the sill structure is mounted in the vehicle.

19. The sill structure according to claim 18 wherein the reinforcement member extends between the first connection and the third connection at an angle α to a vertical direction being within +/−15 degrees when the sill structure is mounted in the vehicle.

20. A vehicle comprising the sill structure according to claim 18.

* * * * *